United States Patent

Stark et al.

[11] Patent Number: 5,976,021
[45] Date of Patent: Nov. 2, 1999

[54] DRIVE SHAFT DAMPER

[75] Inventors: Martin H. Stark, Saginaw; Gary A. Conger, Hemlock; Donald S. Agnew, Saginaw; Donald W. Brewster, Bay City; David A. Galonska, Saginaw, all of Mich.

[73] Assignee: Arrow Paper Products, Co., Saginaw, Mich.

[21] Appl. No.: 08/892,146

[22] Filed: Jul. 14, 1997

[51] Int. Cl.⁶ ........................................................ F16C 3/00
[52] U.S. Cl. .......................... 464/180; 464/183; 138/109; 277/625
[58] Field of Search ..................... 464/180, 179, 464/181, 183; 188/359, 358; 138/96 R, 109; 277/607, 609, 627, 625

[56] References Cited

U.S. PATENT DOCUMENTS

| | | | |
|---|---|---|---|
| 199,349 | 1/1878 | Caswell | 138/109 |
| 254,850 | 3/1882 | Telfer | 277/627 |
| 2,001,165 | 5/1935 | Sweenes | 464/180 |
| 2,001,166 | 5/1935 | Swennes | 464/180 |
| 2,116,705 | 5/1938 | Marx et al. | 277/607 |
| 2,751,765 | 6/1956 | Rowland et al. | 464/180 |
| 3,052,107 | 9/1962 | Kempf | 464/180 |
| 3,075,406 | 1/1963 | Butler, Jr. et al. | 464/180 |
| 3,137,148 | 6/1964 | Kayser | 464/183 |
| 3,274,798 | 9/1966 | Wiggins, Jr. | |
| 3,403,206 | 9/1968 | Thomas et al. | 138/96 R |
| 3,422,856 | 1/1969 | Hunter et al. | 138/109 |
| 3,656,771 | 4/1972 | Stout | 277/607 |
| 3,769,813 | 11/1973 | Okada | |
| 3,811,710 | 5/1974 | Dula et al. | 277/625 |
| 4,014,184 | 3/1977 | Stark | 464/180 |
| 4,124,928 | 11/1978 | Stark | 464/180 |
| 4,909,361 | 3/1990 | Stark et al. | 464/180 |
| 5,653,452 | 8/1997 | Jarvenkyla | 277/607 |

FOREIGN PATENT DOCUMENTS 3-288041 12/1991 Japan ..................... 464/180

*Primary Examiner*—Eileen Dunn Lillis
*Attorney, Agent, or Firm*—Reising, Ethington, Barnes, Kisselle, Learman & McCulloch, P.C.

[57] ABSTRACT

A vibration and noise attenuating damper for an automotive drive shaft has a cylindrical body of such size as snugly to fit within the shaft between its reduced diameter ends and be retained in fixed position. The damper has at each end thereof a seal which bears against the surface of the bore of the shaft. The seal has a wall which is accommodated within the tubular body of the damper. The seal may include an impervious closure which closes the end of the damper. The inner surface of the tubular damper body may be formed of a waterproof material.

19 Claims, 2 Drawing Sheets

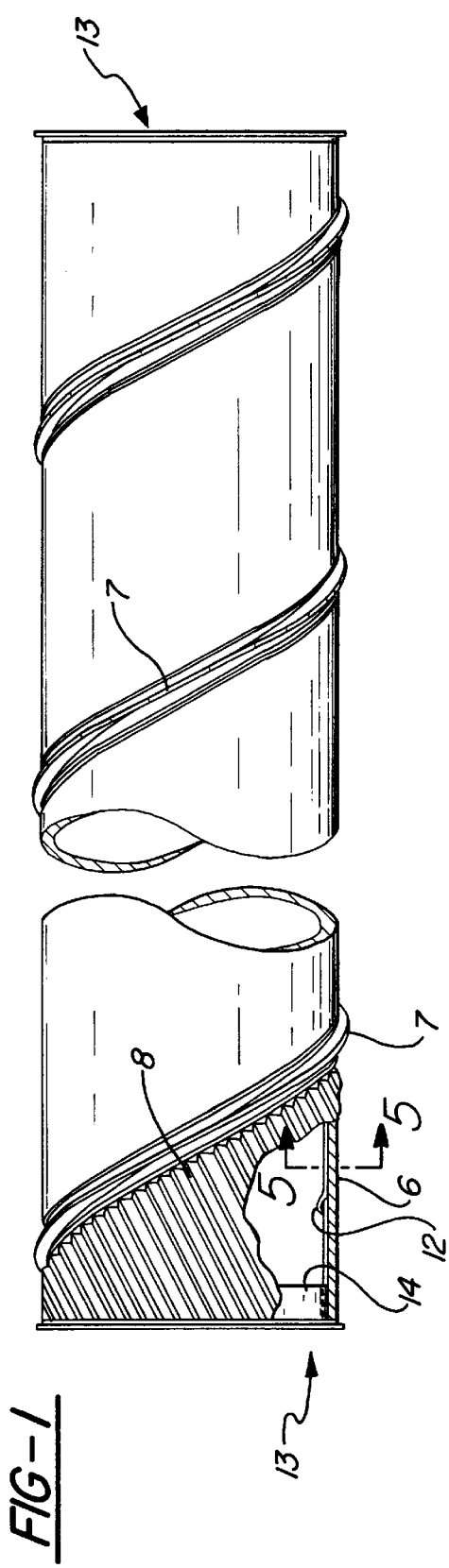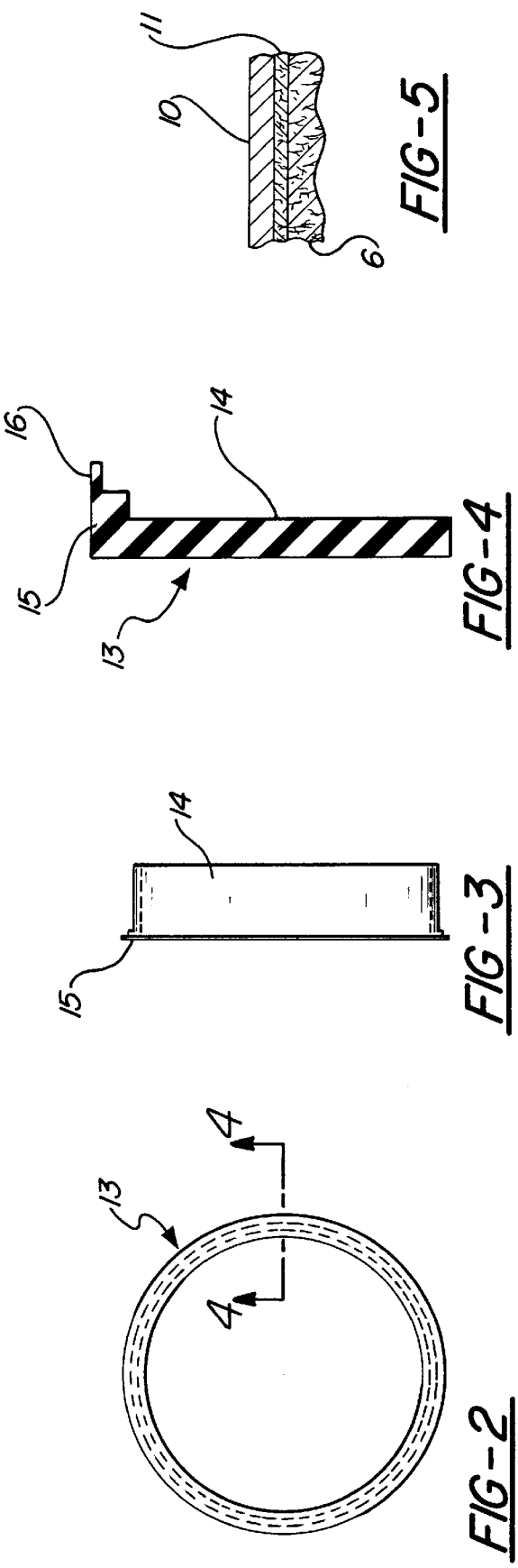

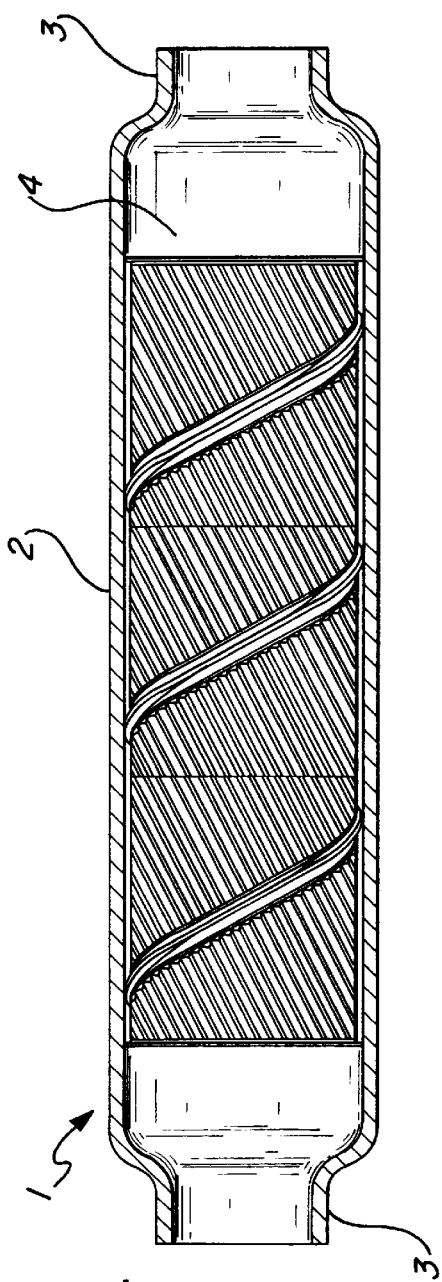
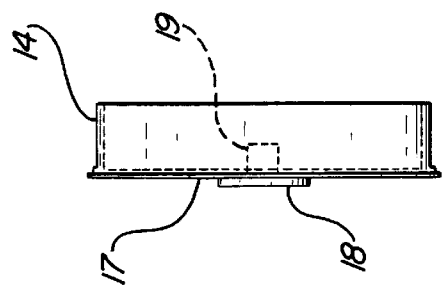
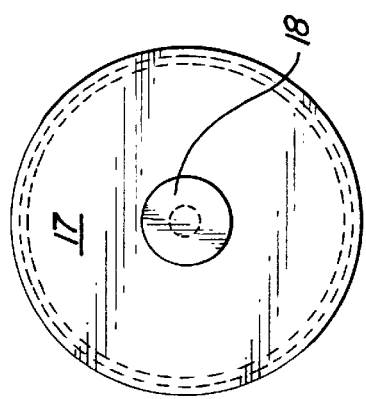
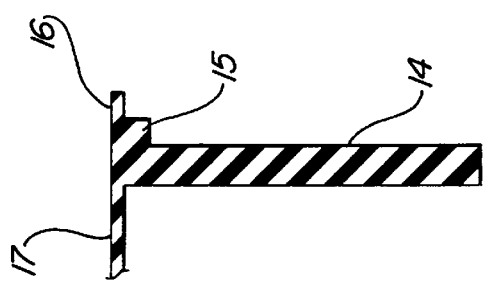
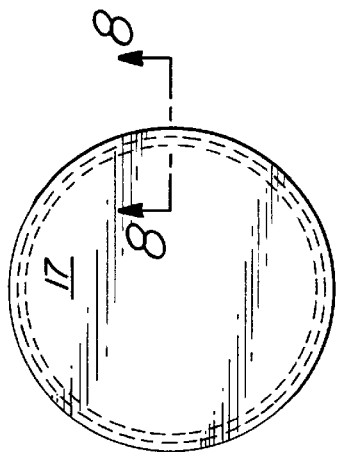

DRIVE SHAFT DAMPER

This invention relates to a tubular damper especially adapted for use in a hollow automotive drive shaft having reduced diameter ends.

BACKGROUND OF THE INVENTION

Some automotive vehicles conventionally utilize hollow, tubular drive or propeller shafts for transmitting driving torque from the engine to the driving wheels. It is not uncommon for such a shaft to be subjected to vibrations from one or more sources. It is desirable to damp such vibrations so as to provide a quieter and smoother ride.

Most of the propeller shafts in use heretofore have been of uniform diameter from one end to the other. Recently, however, some drive shafts have at least one end which is smaller in diameter than the remainder of the shaft. A shaft having such smaller diameter at either or both of its ends has certain advantages, such as enabling the use of smaller universal joints than otherwise would be possible, as well as minimizing the space and weight of the parts required to couple the shaft to the universal joints.

It has been common heretofore simply to slide a substantially cylindrical damper into a hollow drive shaft from one end thereof, the damper being made of materials which damp the vibrations and attenuate noise. Typical examples of such dampers are disclosed in U.S. Pat. Nos. 2,751,765; 3,075,406; 4,014,184; and 4,909,361, the disclosures of which are incorporated herein by reference.

A damper especially adapted for use in conjunction with a propeller shaft having reduced diameter ends is disclosed in copending application Ser. No. 08/779,789 filed Jan. 7, 1997. Such damper can be inserted in a propeller shaft even after the ends of the latter have been reduced in diameter, thereby enabling the damper to be assembled with the drive shaft at any time before the drive shaft is coupled to the vehicle's drive train. In some instances, however, it may be preferred to assemble a damper with a drive shaft before the ends thereof are reduced. This will require that the damper be assembled with the drive shaft by the shaft manufacturer as one of the operating steps in producing the shaft.

SUMMARY OF THE INVENTION

In the manufacture of a metal drive shaft having reduced ends, it is common to extrude a billet formed of aluminum, for example, to a master length following which the tube is heated and aged in a glycol bath. The master length tube then is cut to provide a plurality of individual drive shafts. Each such shaft then is swaged to reduce the diameter at the ends of the shaft, following which each shaft is washed and rinsed with a liquid at approximately 180° F. to flush the swaging compound. The wash/rinse operation may continue for several minutes, following which the shaft is straightened and heat treated for several hours at a temperature of approximately 375° F. Thereafter, the shaft is finished by trimming and chamfering the inside of both ends.

To install a vibration and noise attenuating damper in a drive shaft whose ends are to be reduced in diameter, the damper must be inserted in the drive shaft after the shaft has been cut to the proper length and before the ends of the diameter are reduced. Consequently, following its insertion in the drive shaft the damper must: not interfere with the shaft swaging operation, be resistant to the heating and aging cycle, be resistant to the shaft washing/rinsing liquid, and allow easy removal of chips resulting from trimming and chamfering operations. A drive shaft damper constructed in accordance with the invention possesses all of these characteristics.

THE DRAWINGS

A drive shaft damper constructed in accordance with preferred embodiments of the invention is disclosed in the accompanying drawings wherein:

FIG. 1 is a fragmentary view partly in elevation and partly in section of a damper prior to its assembly with a drive shaft;

FIG. 2 is an elevational view of a sealing ring adapted for inclusion with the damper;

FIG. 3 is an elevational view of the sealing ring;

FIG. 4 is a sectional view on a greatly enlarged scale and taken on the line 4—4 of FIG. 2;

FIG. 5 is a sectional view on a greatly enlarged scale and taken on the line 5—5 of FIG. 1;

FIG. 6 is a view partly in section and partly in elevation of the damper installed in a drive shaft having reduced diameter ends;

FIGS. 7 and 8 correspond to FIGS. 2 and 4, but illustrate a modified seal;

FIG. 9 is a view similar to FIG. 7, but illustrating a modified embodiment; and

FIG. 10 is an elevational view of the seal shown in FIG. 9.

THE PREFERRED EMBODIMENT

A damper of the kind with which the invention is concerned is especially adapted for use in a hollow, cylindrical, metal drive shaft 1 having a substantially uniform diameter central section 2 and opposite ends 3 of reduced diameter formed by a conventional swaging operation. A damper constructed in accordance with the invention is designated generally by the reference character 4 and is adapted to be positioned within the central section 2 of the shaft 1 inwardly from the ends 3 thereof as is shown in FIG. 6. As is obvious from FIG. 6 the damper 4 has an outside diameter or transverse dimension considerably larger than that of the shaft ends 3, as a result of which the liner 4 must be inserted into the shaft 1 before both ends of the latter are reduced in diameter.

The damper 4 corresponds in most respects to that disclosed in U.S. Pat. No. 4,909,361 and has a substantially rigid cylindrical tube or core 6 formed of a suitable number of plies of helically wound paperboard or other suitable material which normally is not waterproof. The core 6 has secured thereto a helically wound, external retaining strip 7 flanked by a corrugated paperboard winding 8. The strip 7 projects beyond the periphery of the core 6 a distance sufficient to enable it to engage and be radially compressed by the inner surface of the bore of the central section 2 of the shaft 1 when the damper is accommodated within the shaft.

The only difference between the core 6 shown in FIG. 1 and the core shown in U.S. Pat. No. 4,909,361 is that the core 6 has an innermost layer 10 of waterproof material such as aluminum foil bonded to a paper or other suitable strip 11 which, in turn, is adhesively secured during the core winding operation to the paperboard strips forming the core. The aluminum foil strip 10 may be about 0.00035 inch and preferably is wider than the paperboard strips of which the core 6 is formed so that there will be a substantial overlap 12 (FIG. 1) at the joint between adjacent convolutions of the waterproof strip, thereby providing a more effective seal against seepage of moisture past the joint.

At each end of the tubular damper 4 is a seal 13 preferably composed of a deformable, resilient, rubbery material such as polyether based polyurethane having a Shore A durometer of about 90. The seal shown in FIGS. 2–4 is circular and has an annular body wall 14 of such size as snugly to be accommodated within and concentric with the core 6, and to extend a short distance axially thereof as is best shown in FIG. 1. At that edge of the wall 14 which extends beyond the corresponding edge of the core 6 is a stepped flange 15 terminating in a thin lip 16 having a diameter a few thousandths inch greater than that of the damper 4. The diameter of the lip 16 is sufficient to cause its peripheral edge to bear snugly against the surface of the bore of the shaft 1 and, preferably, result in slight deformation of the lip so as to ensure the provision of a seal against the bore even though the bores of different shafts formed to allowable tolerances may not be uniform in transverse dimension. However, the underformed diameter of the lip at its peripheral edge even though greater than the diameter of the bore of the shaft 1, is not so great as to interfere objectionably with movement of the damper into the bore of the shaft.

Each seal 13 is secured within the core 6 at one end thereof. This seal may be secured within the core by a suitable adhesive or in any other appropriate manner. If an adhesive is used, it must be one which is waterproof, compatible with the waterproof material 10, and able to withstand the temperatures to which the shaft is subjected.

The seal shown in FIGS. 2–4 does not close the associated end of the liner 4. If desired, however, and as is shown in FIGS. 7–10, the seal may include an impervious, cylindrical membrane 17 which spans the seal so as to form a complete closure for the end of the damper.

In the event it is necessary to vent air from within the core 6 during assembly of the latter and the seals having the impervious closure 17, a seal may include a stopper 18 having a stem 19 which removably extends through and seals an opening in the membrane.

Prior to inserting a damper 4 into a drive shaft 1, the seals 13 are fitted into the opposite ends of the core 6 and adhesively or otherwise secured thereto. The damper then may be inserted into the shaft 1 through either end thereof, as long as that end has not previously been swaged to reduce its diameter. As the damper slides into the shaft, the lips 16 at the peripheral edges of the seals 13 will be able to deflect somewhat so as to enable passage of the damper into the bore of the shaft and still provide a sealing function. The peripheral edges of the retaining strip 7 also will bear against the inner surface of the bore of the shaft to retain the damper in a selected position.

Following the insertion of the damper in the drive shaft, the ends of the latter may be swaged or otherwise acted upon to form the reduced diameter ends 3. Thereafter the wash/rinse, heat treating, trimming, and chamfering operations may be performed in the conventional manner.

The lips 16 of the seals 13 will protect the exterior of the damper from being wetted during the wash/rinse operation and the waterproof inner liner 10 will protect the interior of the damper from being wetted by the wash/rinse liquids. If each seal 13 is provided with the closure 17 (either with or without the stopper 18), it may be possible to dispense with the waterproof liner 10.

The step configuration of the flange 15 of the seal 13 precludes interference between the flange and the materials forming the core at the associated ends thereof.

The disclosed embodiments are representative of presently preferred forms of the invention, but are intended to be illustrative rather than definitive thereof. The invention is defined in the claims.

We claim:

1. A damper for use in a hollow, cylindrical member having a bore of predetermined diameter, said damper comprising a cylindrical core having an outer diameter of such dimension as snugly to be accommodated in the bore; and a seal at each end of said core, each said seal comprising a body having a cylindrical wall concentric with said core and extending axially thereof, and a radially outwardly extending flange at one end of said wall said flange being formed of resiliently deformable friction material and having an undeformed diameter greater than that of the bore whereby when the damper is accommodated in said bore each said flange will extend radially and forcibly bear upon the surface of the bore thereby providing a seal between the surface of the bore and said core and securing said damper within said member.

2. The damper according to claim 1 wherein said flange has radially inner and outer sections of different thickness.

3. The damper according to claim 2 wherein said outer section is thinner than the radially inner section.

4. The damper according to claim 1 wherein said core is annular and has a waterproof inner surface.

5. The damper according to claim 1 wherein said wall is accommodated within said core.

6. The damper according to claim 1 wherein said flange is spanned by a closure.

7. The damper according to claim 6 wherein said closure has an opening therein sealed by a stopper removably accommodated in said opening.

8. The damper according to claim 1 wherein said seal is annular.

9. The damper according to claim 1 wherein said core is annular and has an inner surface formed by a liner of waterproof material.

10. The damper according to claim 9 wherein said core is formed of helical strips of material.

11. The damper according to claim 9 wherein said liner of waterproof material is formed of a helically wound strip wider than the strips of material forming said core.

12. A shaft and damper construction comprising a tubular shaft having ends spaced from one another by a central section having a cylindrical bore, the bore of said central section having a diameter greater than that of each of said ends; a damper comprising, a cylindrical hollow substantially rigid core having an inner surface and accommodated in the central section of said shaft, said core having a diameter corresponding substantially to that of the bore of said central section; frictional retaining means carried by said core and in engagement with said bore for maintaining said core in a selected position in said bore; a seal at each end of said core, each said seal comprising a body having a wall concentric with and carried by said core at one end thereof, each said seal having a radially outwardly extending flange in engagement with said bore, each said flange being formed of resiliently deformable friction material and having an undeformed diameter greater than that of said bore, thereby causing each said flange to be radially deformed when said damper is within said shaft; and waterproof means carried by and within said core for sealing the inner surface of said core.

13. The construction according to claim 12 wherein said wall of each of said seals is within said core.

14. The construction according to claim 12 wherein said wall of each of said seals is spanned by a closure.

15. The damper according to claim 14 wherein said closure has an opening therein sealed by a stopper removably accommodated in said opening.

16. The construction according to claim 12 wherein each of said seals is annular.

17. The construction according to claim 12 wherein each of said seals has a radially outward extending flange having a peripheral edge in sealing engagement with the surface of said bore.

18. The construction according to claim 17 wherein each of said flanges has a reduced thickness peripheral lip.

19. The construction according to claim 12 wherein said waterproof means comprises a layer of waterproof material forming the inner surface of said core.

* * * * *